US006738157B1

(12) United States Patent
Hirose

(10) Patent No.: US 6,738,157 B1
(45) Date of Patent: May 18, 2004

(54) IMAGE RECORDING APPARATUS

(75) Inventor: Emiko Hirose, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/249,166

(22) Filed: Feb. 12, 1999

(30) Foreign Application Priority Data

Feb. 16, 1998 (JP) .......................................... 10-032906

(51) Int. Cl.[7] ............................................... G06F 15/00

(52) U.S. Cl. ........................ 358/1.16; 358/1.1; 358/296

(58) Field of Search ......................... 358/1.1, 1.5, 1.12, 358/1.13, 1.14, 1.15, 1.16, 298; 399/9

(56) References Cited

U.S. PATENT DOCUMENTS 5,940,653 A * 8/1999 Maekawa et al. .............. 399/9
5,995,718 A * 11/1999 Hiraike et al. ............. 358/1.16

* cited by examiner

*Primary Examiner*—Mark Wallerson
(74) *Attorney, Agent, or Firm*—Rabin & Berdo, P.C.

(57) ABSTRACT

An image recording apparatus is provided which includes a selection information storage (62) made of a non-volatile memory for holding information on one of paper trays (42), (45), (48) selected by an operation of a control panel (55) and information on a paper tray selection command issued by a host device (56'). When resuming an operation, the apparatus operates based on the information stored in the selection information storage (62).

34 Claims, 12 Drawing Sheets

| MENU | SELECTION |
|---|---|
| TRAY SELECTION | TRAY1<br>TRAY2<br>FRONT TRAY |
| FONT SELECTION | FRONT1<br>FRONT2<br>FRONT3<br>FRONT4 |

| SELECTED TRAY | DISTANCE TO ENTRANCE SENSOR | TYPE OF PAPER | LENGTH OF PAPER | TRANSFER CURRENT | FIXING TEMP |
|---|---|---|---|---|---|
| TRAY1 | L1 | A4 | L5 | I1 | T1 |
| TRAY2 | L2 | B5 | L6 | I2 | T2 |

FIG. 13

| TYPE OF ERROR | MONITORED RANGE | REFERENCE VALUE |
|---|---|---|
| PAPER FOED ERROR | FROM START OF HOPPING TO ENTRANCE SENSOR ON | DEPENDING ON SELECTED TRAY (L1, L2) |
| PATH PAPER JAM 1 | FROM ENTRANCE SENSOR ON TO WRITE SENSOR ON | L3 |
| PATH PAPER JAM 2 | FROM WRITE SENSOR ON TO EJECTION SENSOR ON | L4 |
| OUTLET PAPER JAM | FROM EJECTION SENSOR ON TO EJECTION SENSOR OFF | DEPENDING ON LENGTH OF PAPER (L5, L6) |

IMAGE RECORDING APPARATUS

BACKGROUND OF THE INVENTION

1. Technical Field of the Invention

The present invention relates generally to an image recording apparatus such as a printer or a copying machine, and more particularly to an image recording apparatus having a plurality of paper trays.

2. Related Art

Usually, in conventional image recording apparatuses such as printers or copying machines having a plurality of paper trays, sheets different in size or orientation by, for example, 90° are stacked in the paper trays. A user, thus, needs to select desired one of paper trays through a control panel installed on a front surface of the apparatus prior to initiation of a printing operation. In order to minimize the user's operation for selection of the paper trays, there has been proposed a system designed to determine particular one of the paper trays which would be employed frequently as a default tray and select it when a power supply is turned on.

In recent years, as one of measures for energy saving, an operator turns off a power supply of printers or copying machines when leaving his or her seat for a noon recess, for example, and turns on it when the operator uses the printers or the copying machines again. The power supply is, thus, turned on and off frequently. The conventional printers or copying machines are designed to select a default tray when the power supply is turned on, so that the information on the paper tray selected immediately before the power supply is turned off is reset to a default value. When the operator resumes work where he or she left off, the operator needs to select one of the paper trays again.

SUMMARY OF THE INVENTION

It is therefore a principal object of the present invention to avoid the disadvantages of the prior art.

It is another object of the present invention to provide an image recording apparatus capable of resuming an operation effectively without need for selecting a desired paper tray from default values when a power supply is turned on.

It is a further object of the invention to provide an image recording apparatus capable of resuming an operation effectively without need for selecting a desired font from default values when a power supply is turned on.

According to one aspect of the invention, there is provided an image recording apparatus which supplies to an image forming portion a recording medium in selected one of a plurality of recording medium storage portions in which recording mediums are stored and which is kept in a standby mode when a power supply is turned on, comprising: (a) a specifying mechanism specifying one of the recording medium storage portions for selecting the recording medium to be supplied from the recording medium storage portions to the image forming portion; (b) a memory holding information on the one of the recording medium storage portions specified by the specifying mechanism even when the power supply is turned off; and (c) a selection mechanism selecting the one of the recording medium storage portions specified by the specifying mechanism based on the information held in the memory when the power supply is turned on and the standby mode is entered.

In the preferred mode of the invention, the information on the one of the recording medium storage portions is held in the memory until the specifying mechanism specifies another recording medium storage portion.

The storage of the information in the memory is accomplished in a power off process executed after a power supply switch is turned off.

The specifying mechanism includes a control panel having a selection key and a recognition circuit which, when the selection key is pressed, recognizes one of the recording medium storage portions specified by the pressed the selection key.

The recording apparatus is connected to a host device. The specifying mechanism includes a receiver circuit for receiving a command signal outputted from the host device and an analyzing circuit for analyzing the command signal received by the receiver circuit.

According to another aspect of the invention, there is provided an image recording apparatus which has a plurality of fonts and performs image processing by selecting one of the fonts and unwinding received data to provide bit-mapped data and which is kept in a standby mode when a power supply is turned on, comprising: (a) a specifying mechanism specifying one of the fonts; (b) a memory holding information on the one of the fonts specified by the specifying mechanism even when the power supply is turned off; and (c) a selection mechanism selecting the one of the fonts specified by the specifying mechanism based on the information held in the memory when the power supply is turned on and the standby mode is entered.

In the preferred mode of the invention, the information on the one of the fonts is held in the memory until the specifying mechanism specifies another font.

According to a further aspect of the invention, there is provided an image recording apparatus which supplies to an image forming portion a recording medium in selected one of a plurality of recording medium storage portions in which recording mediums different in standard or in orientation are stored and which is kept in a standby mode when a power supply is turned on, comprising: (a) a specifying mechanism specifying one of the recording medium storage portions for selecting the recording medium to be supplied from the recording medium storage portions to the image forming portion; (b) a memory holding therein information on the one of the recording medium storage portions specified by the specifying mechanism and control information corresponding to the information even when the power supply is turned off; and (c) a control circuit selecting the one of the recording medium storage portions specified by the specifying mechanism and controlling an operation of the image forming portion based on the information containing the control information held in the memory when the power supply is turned on and the standby mode is entered.

In the preferred mode of the invention, the information in the memory is held until the specifying mechanism specifies another recording medium storage portion.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 13 is a table representing the relation between the types of errors which would arise during transportation of copy sheets and error-monitored conditions.

DESCRIPTION OF THE PREFERRED EMBODIMENTS (First Embodiment)

Figure 1:
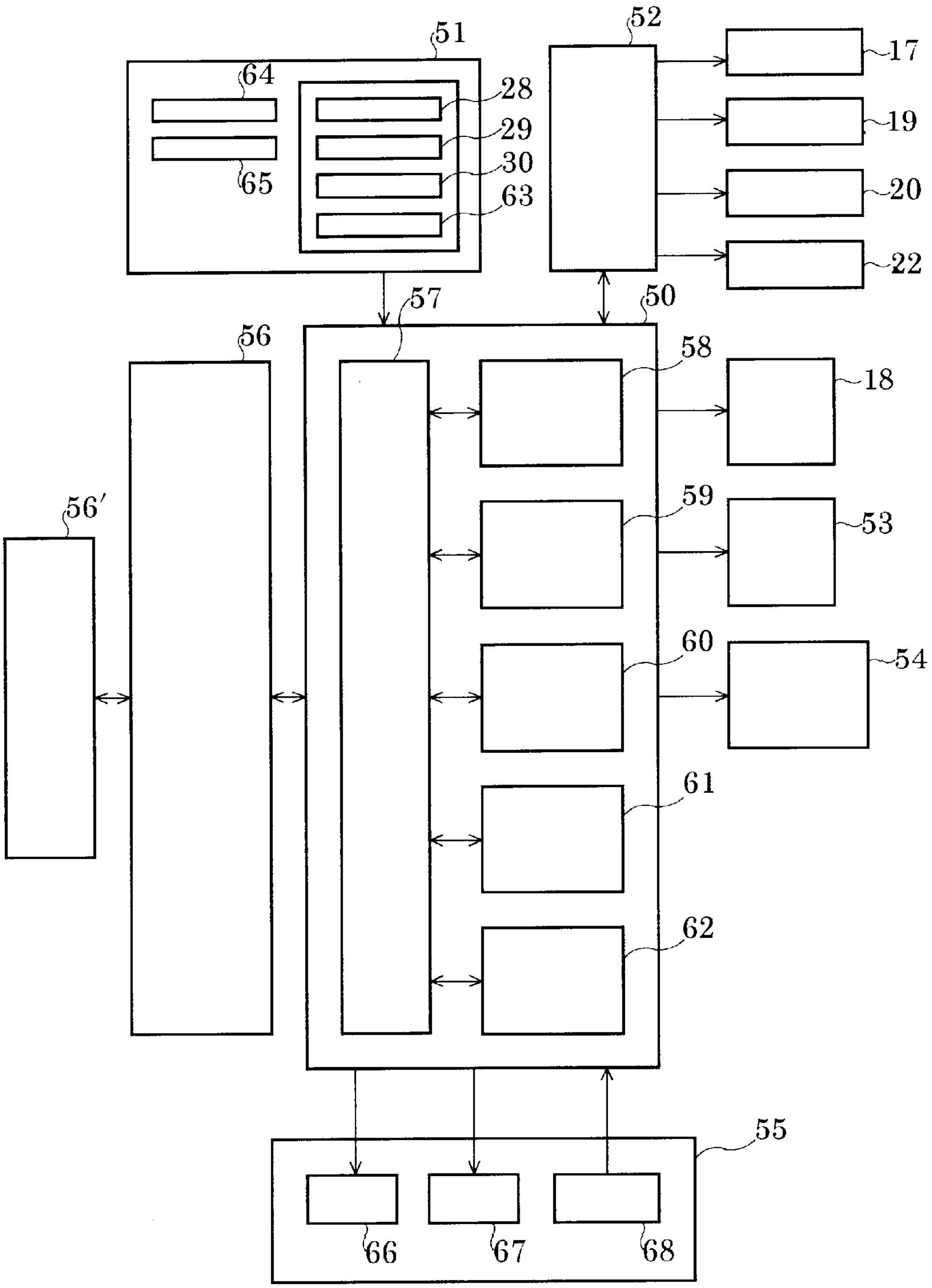
FIG. 1 is a block diagram which shows an image recording apparatus according to the first embodiment of the invention.
Figure 2:
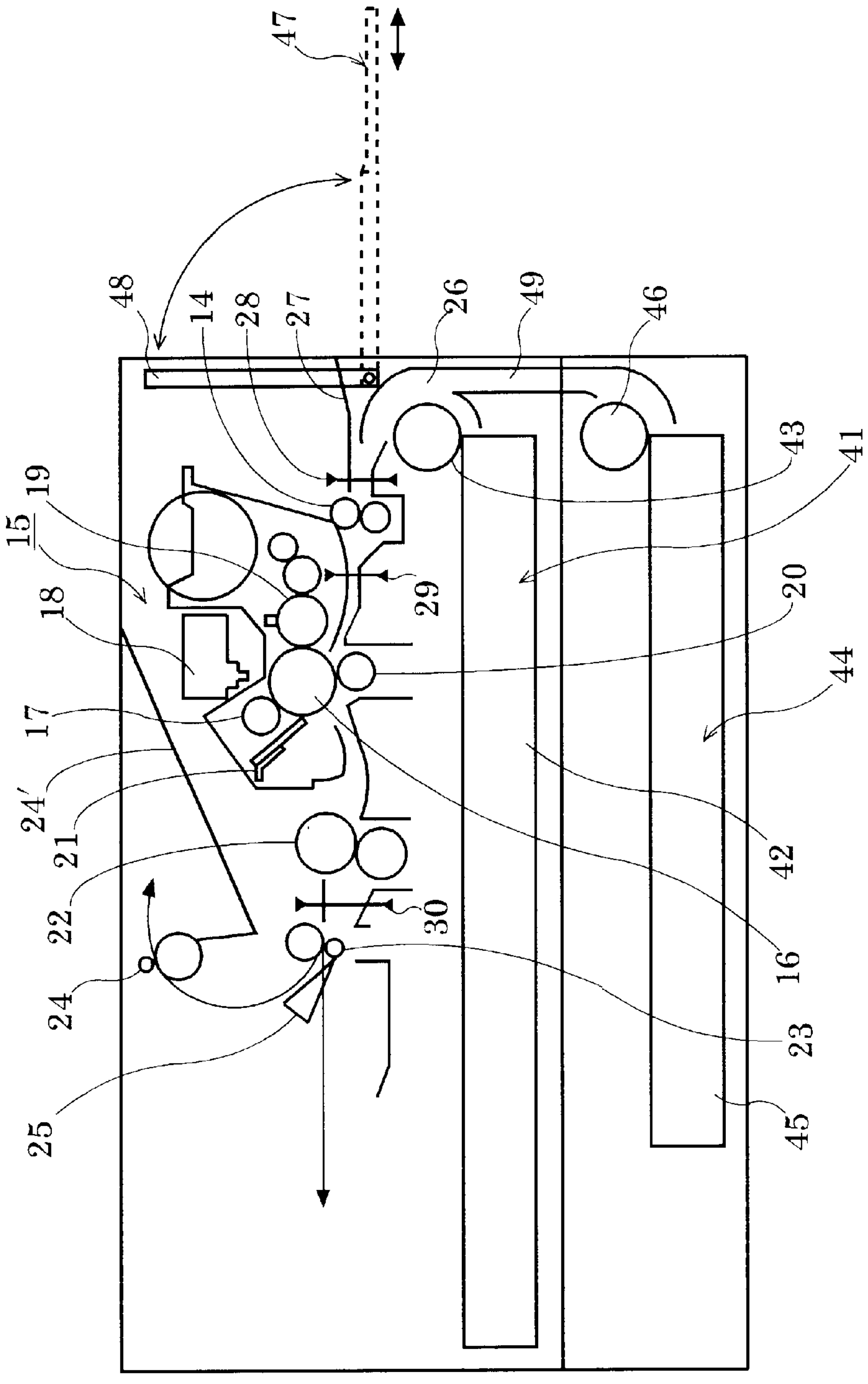
FIG. 2 is a cross sectional view which shows the image recording apparatus of FIG. 1.

Referring now to the drawings, particularly to FIGS. 1 and 2, there is shown a electrophotographic printer according to the first embodiment of the invention.

The electrophotographic printer, as shown in FIG. 2, includes generally a first paper feed mechanism 41, a second paper feed mechanism 44, and a third paper feed mechanism 47.

The first paper feed mechanism 41 includes a first paper tray 42 storing therein a stack of copy sheets, a first hopping roller 43 disposed on an upper end of the first paper tray 42, and a paper sensor (not shown) monitoring the presence or absence and the size of the copy sheets. The copy sheet fed by the hopping roller 43 out of the first paper tray 42 passes through a travel route 26 and reaches register rollers 14. Similarly, the second paper feed mechanism 44 includes a second paper tray 45 storing therein a stack of copy sheets, a second hopping roller 46 disposed on an upper end of the second paper tray 45, and a paper sensor (not shown) monitoring the presence or absence and the size of the copy sheets. The copy sheet fed by the hopping roller 46 out of the second paper tray 45 passes through a travel route 49 and the travel route 26 and reaches the register rollers 14. The first and second paper feed mechanisms 41 and 44 are disposed within a lower portion of the printer to decrease an area occupied by the whole of the electrophotographic printer. The second paper feed mechanism may be provided as an option.

The third paper feed mechanism 47 includes a telescopic manual paper feed tray 48 installed pivotably on a side wall of the printer body and a paper sensor (not shown) monitoring the presence or absence and the size of copy sheets. The manual paper feed tray 48, when not used, is stored in the printer body, as indicated by a solid line in FIG. 2, while, when required to be used, can be turned to a horizontal angle, as indicated by a broken line and extended. The third paper feed mechanism 47 leads to a travel route 27 which is provided straight for feeding special sheets such as envelopes or postal cards. The use of the third paper feed mechanism 47 allows the special sheets to be transmitted to the register rollers 14 without bending them.

The paper feed mechanisms 41, 44, and 47 operate under control of a control unit 50, as will be described later, and constitute a tray selecting mechanism along with the control circuit 50.

The copy sheet fed through the travel route 26 or 27 is ejected to an ejected sheet tray 24' through an image-forming unit 15, a fixing unit 22, and ejecting rollers 23 and 24 which are disposed along a paper feed path. The image-forming unit 15, as is well known in the art, consists of a photosensitive drum 16, a charging unit 17, an LED head 18, a developing mechanism 19, a transfer mechanism 20, and a cleaning mechanism 21. Disposed downstream of the ejecting roller 23 is a sheet separator 25 for switching between destinations to which the sheet is ejected.

On the paper feed path extending over the register rollers 14, the developing mechanism 19, the photosensitive drum 16, the transfer mechanism 20, and the fixing mechanism 22, sensors 28 to 30 are installed for controlling the traveling of the copy sheets. The reference number 28 indicates an entrance sensor. The reference number 29 indicates a write sensor. The reference number 30 indicates an ejection sensor. The sensors 28 to 30 are implemented with photosensors designed to interrupt an optical axis directly by a sheet or by an actuator.

FIG. 1 is a block diagram of a control system of the electrophotographic printer.

As shown in FIG. 1, the printer of the first embodiment includes the control unit 50, the sensor unit 51, the high voltage power supply circuit 52, the LED head 18, the drum motor 53, the paper feed motor 54, the control panel 55, the interface circuit 56, and signal lines and buses for connections of the components.

The control unit 50 control the operation of the whole of the printer including the paper feed mechanisms 41, 44, and 47 and the image-forming unit 15 and consist of a CPU 57 and memories 58 to 62. The program ROM 58 is a memory for storing therein a control program. The font ROM 59 is a memory for storing therein fonts. The image memory 60 is a RAM for storing therein image data. The current information storage 61 is a RAM for storing therein information on selected one of the paper trays etc. The selection information storage 62 holds the information on selected one of the paper trays when the power supply is turned off and is implemented with a static RAM that is non-volatile by the backup power or an EEPROM. The control unit 50 is connected to the host device 56' such as a word processor or a personal computer through the interface circuit 56. Command signals from the host device 56' are received by the control unit 50 including the CPU 57 and analyzed thereby.

The sensor unit 51 includes, in addition to the entrance sensor 28, the write sensor 29, and the ejection sensor 30 disposed on the paper feed path, a paper transportation system sensor such as the paper sensor 63 installed in each paper feed mechanism, the temperature sensor 64 for measuring the temperature of the fixing mechanism 22, and the toner sensor 65 for measuring the quantity of toner remaining in the developing mechanism 19.

The high voltage power supply circuit 52 connects with the charging mechanism 17, the developing mechanism 19, the transfer mechanism 20, and the fixing mechanism 22 and supplies the power thereto under in response to a control signal from the control unit 50.

The control panel 55 includes the LED lamp 66, the LCD 67, and switches 68. The control unit 50 displays the status of the printer through the LED lamp 66 of the control panel 55, receives information signals from the switches 68 of the control panel 55 to store them in the current information storage 61 and the selection information storage 62, and indicates the information signals stored in the current information storage 61 on the LCD 67 of the control panel 55.

Figures 3, 4:
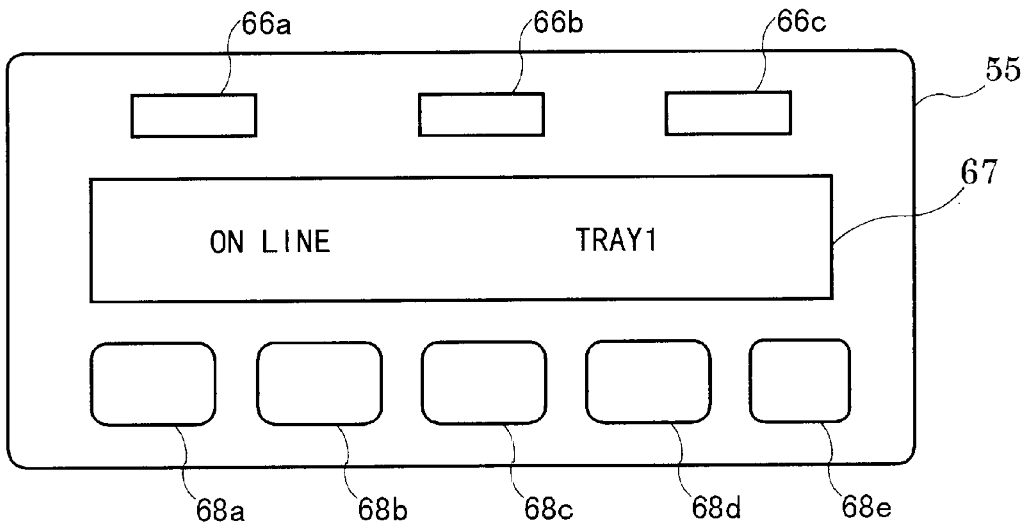
FIG. 3 is an illustration which shows a key arrangement on a control panel.
FIG. 4 is a table representing options or functions a user may choose using a menu switch.

The control panel 55, as shown in FIG. 3, includes three LED lamps, one LCD, and five switches. The LED lamps are the power lamp 66*a* for indicating an on/off state of the power supply which emits green light when the power supply is turned on, while it is turned off when the power supply is turned off, the on-line lamp 66*b* for indicating whether the printer is in the on-line mode or the off-line mode which emits green light when the printer is in the on-line mode, while it is turned off when the printer is in the off-line mode, and the paper lamp 66*c* for indicating whether the copy sheets are present or not which emits red light when there is no sheet, while it is turned off when the copy sheet are present. The LCD 67 indicates currently selected one of the modes and the information stored in the current information storage 61. The five switches are the one-line switch 68*a* for selecting one of the on-line mode and the off-line mode, the menu switch 68*b* for selecting one of options or functions, as will be described later, the tray selection switch 68*c* for selecting one of the paper feed trays, the font selection switch 68*d* for selecting one of the fonts, and the confirmation switch 68*e* for confirming the above selected data. Thus, the control panel 55 constitutes, together with the control unit 50, a mechanism which selects and specifies one of the paper trays and a mechanism which selects and specifies one of the fronts.

FIG. 4 is a table representing options or functions a user may choose using the menu switch 68*b*. Only two functions: tray selection and font selection are illustrated for the brevity of explanation. One of the functions is selected by pressing the menu switch 68*b*. Specifically, the tray selection function and the font selection function is switched each time the menu switch 68*b* is pressed. Each time the tray selection switch 68*c* is pressed while the tray selection function is chosen, one of trays is selected in sequence in order of, for example, a tray 1, a tray 2, a front tray, the tray 1, . . . . Similarly, each time the font selection switch 68*d* is pressed while the font selection function is chosen, one of fonts is selected in sequence in order of, for example, a font 1, a font 2, a font 3, a font 4, the font 1, . . . .

The input of information by an operation of each key on the control panel 55 is confirmed by the control unit 50 including the CPU 57 operating in accordance with a program in the program ROM 58.

An paper tray selection operation of the first embodiment will be described below with reference to FIGS. 5 to 8. FIGS. 5 to 8 are flowcharts of operations of the first embodiment.

Figure 5:
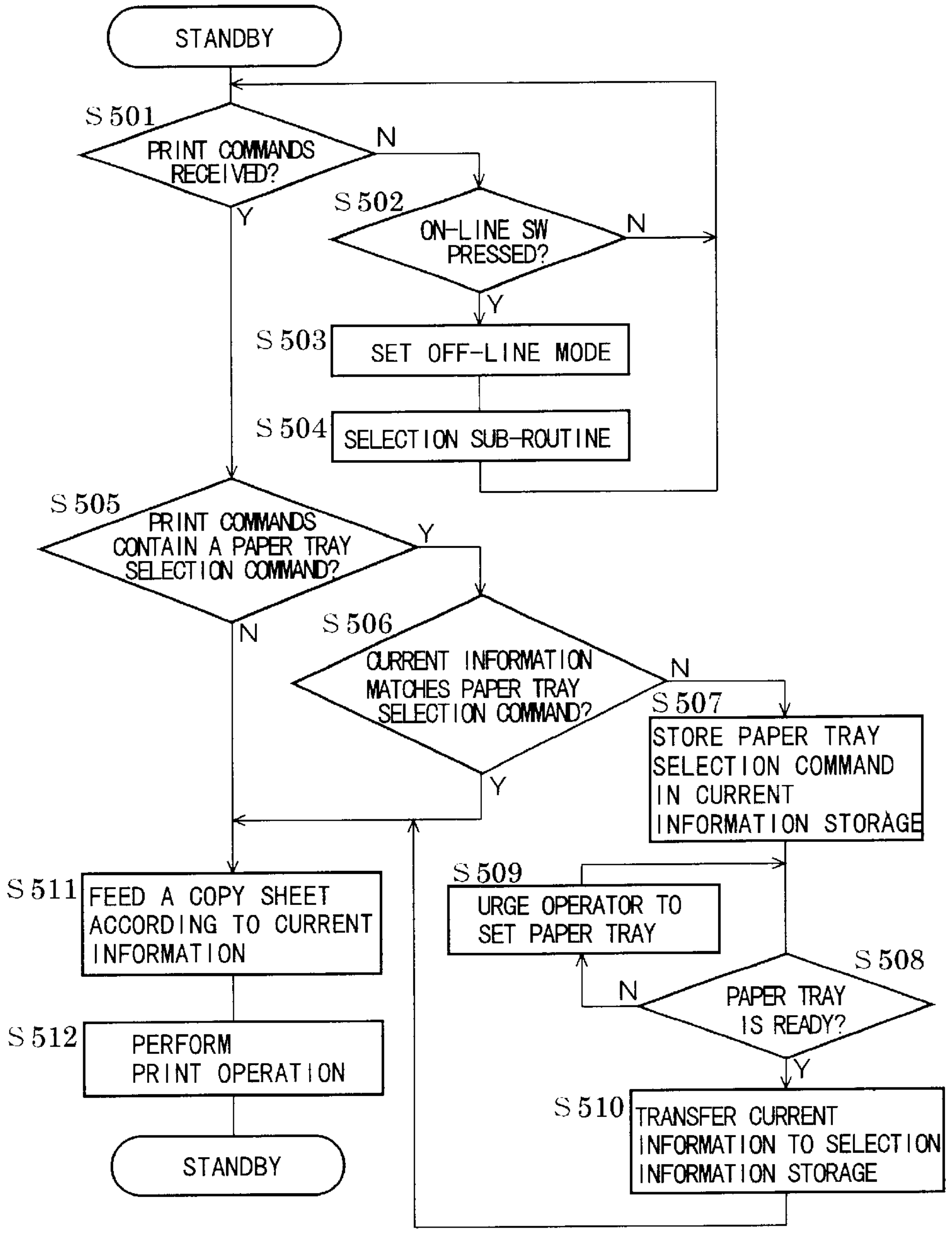
FIG. 5 is a flowchart of an operation of an image recording apparatus.

FIG. 5 shows a program or sequence of logical steps of a printer operation performed when a power supply switch is turned on. The one-line mode is entered immediately after the power supply switch is turned on.

Figure 6:
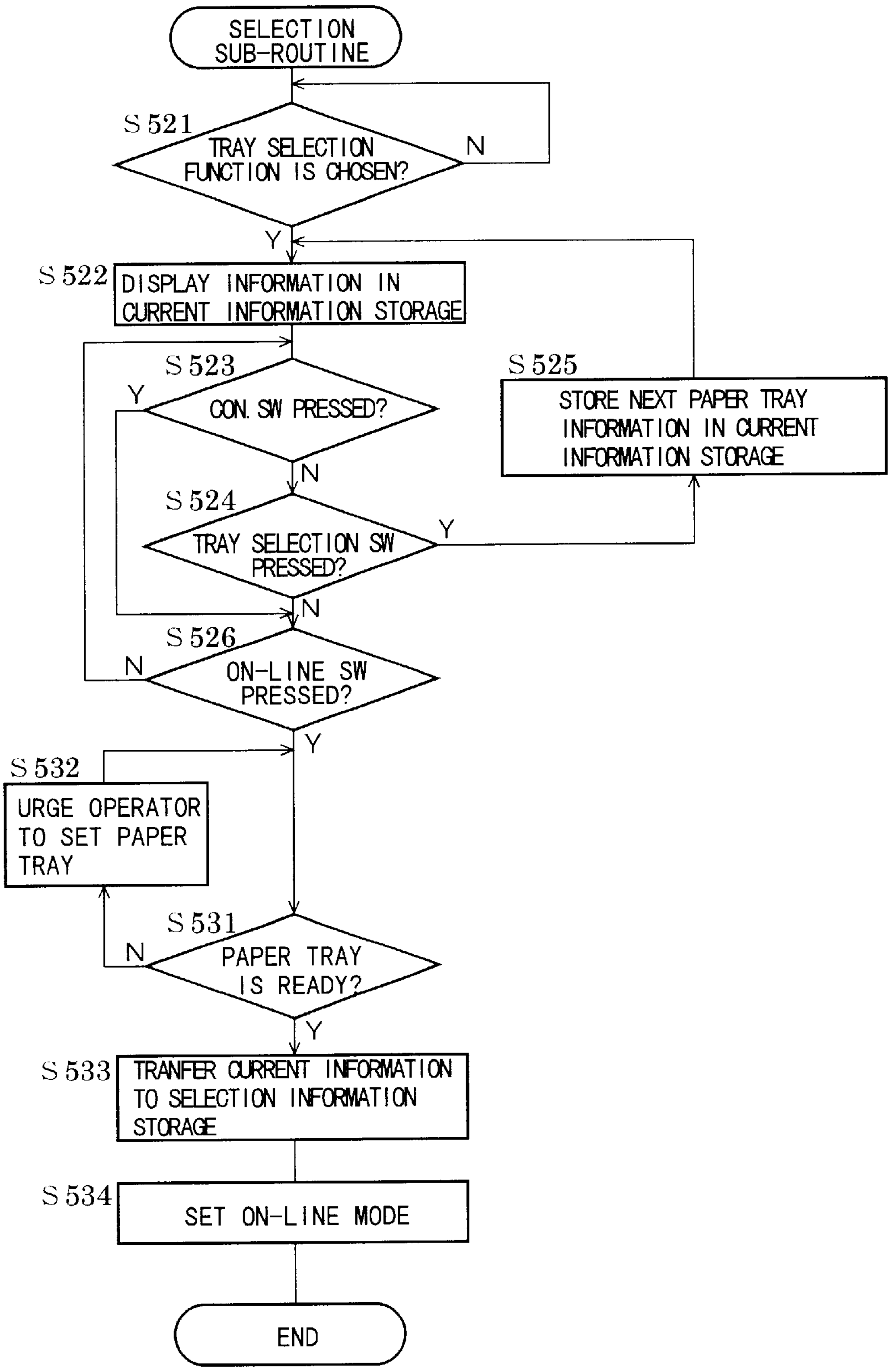
FIG. 6 is a flowchart of a paper tray selection.

After entering the program, the routine proceeds to step 501 wherein it is determined whether print commands have been received from the host device 56' through the interfacing circuit 56 or not. If a YES answer is obtained, then the routine proceeds to step 505. Alternatively, if a NO answer is obtained, then the routine proceeds to step 502 wherein it is determined whether the on-line switch 68*a* has been pressed or not. If a NO answer is obtained, then the routine returns back to step 501. Alternatively, if a YES answer is obtained, then the routine proceeds to step 503 wherein the printer is brought into the off-line mode. The routine then proceeds to step 504 of the paper tray selection to be made by the control panel 55, as shown in FIG. 6.

After entering step 504, the routine proceeds to step 521 wherein it is determined whether the tray selection function is chosen by the menu switch 68*b* or not. If a YES answer is obtained, then the routine proceeds to step 522 wherein the information in the current information storage 61 is displayed on the LCD 67 for informing an operator of selected one of the paper trays. The routine proceeds to step 523 wherein it is determined whether the confirmation switch 68*e* has been pressed or not. If a YES answer is obtained, then the routine proceeds to step 526. Alternatively, if a NO answer is obtained, then the routine proceeds to step 524 wherein it is determined whether the tray selection switch 68*c* has been pressed or not. If a YES answer is obtained, then the routine proceeds to step 525 wherein information about one of the paper trays selected in accordance with the procedure for paper tray selection as explained in FIG. 4 is stored in the current information storage 61 and returns back to step 522.

If both the confirmation switch 68*e* and the tray selection switch 68*c* are not pressed, then the routine proceeds to step 526 wherein it is determined whether the one-line switch 68*a* has been pressed or not. If a NO answer is obtained, then the routine returns back to step 523. Alternatively, if a YES answer is obtained, then the routine proceeds to step 531 wherein it is determined whether the paper tray selected and stored in the current information storage 61 is ready for feeding the copy sheets or not. Specifically, in the case where one of the first and second paper feed mechanisms 41 and 44 is selected, it is determined whether conditions that the paper tray is installed properly in the printer and that copy sheets are stacked on the paper tray are satisfied or not. In the case where the third paper feed mechanism 47 is selected, conditions that the manual paper feed tray 48 has been opened to a usable position and that copy sheets are stacked on the manual paper feed tray 48 are satisfied or not.

If a NO answer is obtained in step 531, then the routine proceeds to step 532 wherein the operator is urged to set the paper tray through the LCD 67 and the paper lamp 66*c*. If the paper tray is ready, the routine proceeds to step 533 wherein the information stored in the current information storage 61, that is, the information from the control panel 55 including information on the tray selection is transferred to the selection information storage 62. The routine proceeds to step 534 wherein the one-line mode is entered and terminates.

Referring back to FIG. 5, if it is determined in step 501 that the print commands have been received, the routine proceeds to step 505 wherein it is determined whether the received print commands contains a paper tray selection command or not. If a NO answer is obtained, then the routine proceeds to step 511. Alternatively, if a YES answer is obtained, then the routine proceeds to step 506 wherein it is determined whether the information stored in the current information storage 61 matches the content of the paper tray selection command or not. If a YES answer is obtained, then the routine proceeds to step 511. Alternatively, if a NO answer is obtained, then the routine proceeds to step 507 wherein the content of the paper tray selection command is stored in the current information storage 61. The routine proceeds to step 508 wherein it is determined whether it is determined whether the paper tray is ready or not. If a NO answer is obtained, then the routine proceeds to step 509 wherein the operator is urged to set the paper tray. Alternatively, if a YES answer is obtained, then the routine proceeds to step 510 wherein the information in the current information storage 61 is stored in the selection information storage 62. Thus, when the tray selection command different from the information set by the control panel 55, stored in the selection information storage 62 in step 533 is issued by the host device 56', the data in the selection information storage 62 is rewritten to store the tray selection command from the host device 56'. The routine proceeds to step 511 wherein the paper feed operation is started to pick the copy sheets out of the paper tray selected according to the information in the current information storage 61 and goes to a normal printing routine.

Figure 7:
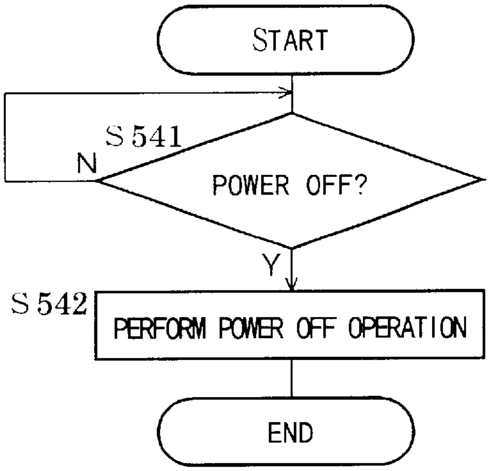
FIG. 7 is a flowchart of a power-off operation.
Figure 8:
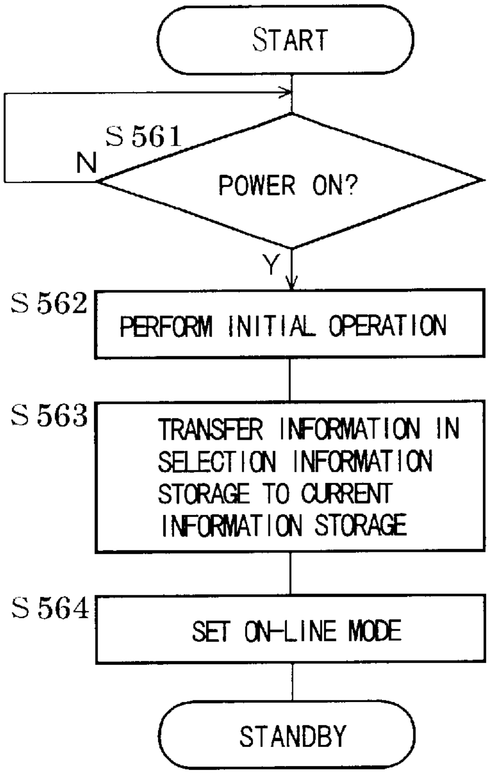
FIG. 8 is a flowchart of a power on operation.

As described above, the information on the paper tray selected by the control panel 55 or the information on the paper tray selection command sent from the host device are stored in the selection information storage 62. Thus, as shown in the flowchart of FIG. 7, only by performing the normal power off operation in step 542 after the turning off of the power supply switch is detected in step 541, the information on the paper tray selected before the power supply switch is turned off is held even after completion of the printer operation. Therefore, as shown in the flowchart of FIG. 8 performed when the power switch is turned on, after the turning on of the power supply switch is detected in step 561, and normal initial processing is performed in step 562, the information in the selection information storage 62 is stored in the current information storage 61 in step 563. Specifically, the information on the paper tray 42, 45, or 48 selected before the power supply switch is turned off is transferred to the current information storage 62 by the processing based on that information, thereby allowing the paper tray 42, 45, or 48 selected before the power supply switch is turned off to be prepared automatically when the power supply switch is turned on.

After the information is transferred to the current information storage 61, the printer enters the on-line mode (step 564) and takes a pause. When the printer is at rest in the on-state of the power supply, the information in stored in the selection information storage 62 is held in the current information storage 61. Thus, when the printer is started again, the printer operates according to the information set before it takes a pause as long as another information is set.

As apparent from the above discussion, the first embodiment stores the information on the paper tray 42, 45, or 48 selected by the control panel 55 or the information on the paper tray selection command sent from the host device 56' in the selection information storage 62 made of a non-volatile memory, thereby allowing the information on the selected paper tray to be held even after the power supply is turned off so that that paper tray is selected automatically when the power supply is turned on again.

Additionally, the selected information is held even when a cover of the printer is opened for the purpose of maintenance or removing jammed paper, thereby allowing the paper tray selected before the cover is opened to be selected automatically when the cover is closed.

(Second Embodiment)

The second embodiment will be described below which is designed to hold selection of fronts in a non-volatile memory for allowing it to be read out of the memory when the power supply is turned on. The structure of this embodiment is identical with that of the first embodiment, and explanation thereof in detail will be omitted here.

Figure 9:
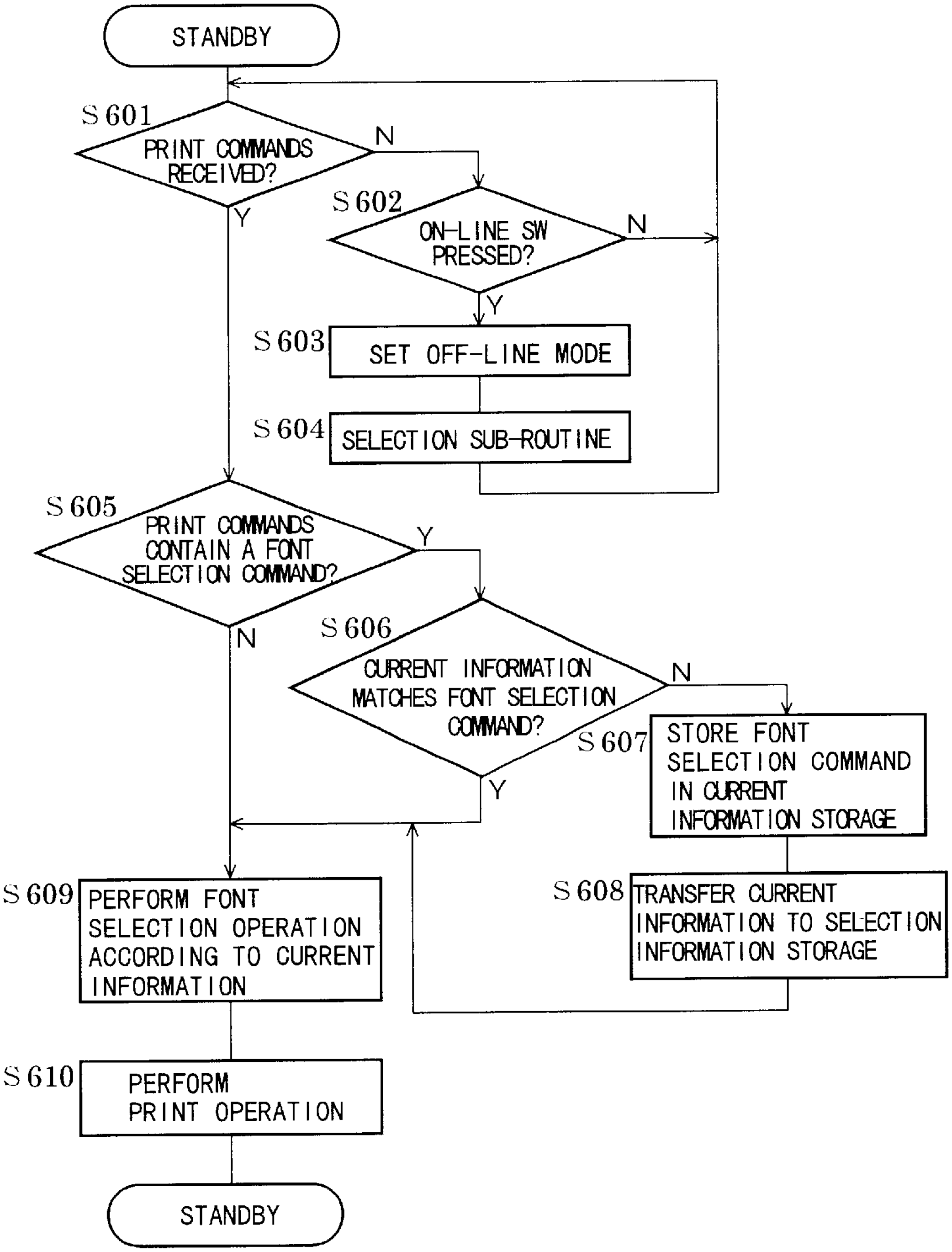
FIGS. 9 and 10 are flowcharts of operations of an image recording apparatus according to the second embodiment of the invention.
Figure 10:
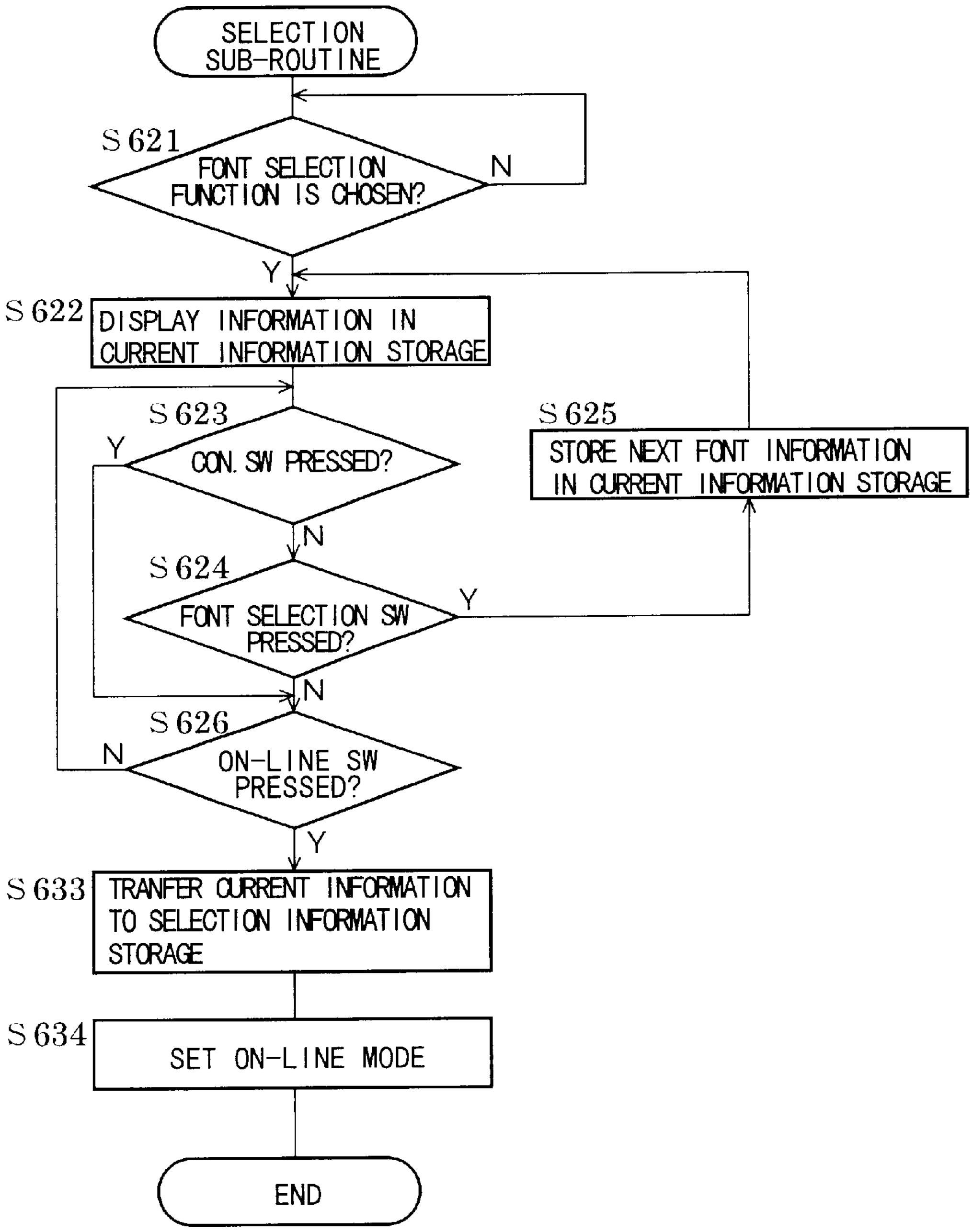

FIGS. 9 and 10 are flowcharts of a program performed by the second embodiment which are different from the one shown in FIG. 5 is step 604 and steps following step 605. Other steps are identical, and explanation thereof in detail will be omitted here.

A front selection operation executed in step 604 will first be described with reference to FIG. 10.

In step 621, it is determined whether the menu switch 68*b* has been pressed to choose the font selection function or not. If a NO answer is obtained, then the routine repeats step 621. Alternatively, if a YES answer is obtained, then the routine proceeds to step 622 wherein the information in the current information storage 61 is displayed on the LCD 67 for informing an operator of selected one of the fonts. The routine proceeds to step 623 wherein it is determined whether the confirmation switch 68e has been pressed or not. If a YES answer is obtained, then the routine proceeds to step 626. Alternatively, if a NO answer is obtained, then the routine proceeds to step 624 wherein it is determined whether the font selection switch 68*d* has been pressed or not. If a YES answer is obtained, then the routine proceeds to step 625 wherein information about one of the fonts selected in accordance with the procedure for font selection as explained in FIG. 4 is stored in the current information storage 61 and returns back to step 622.

If both the confirmation switch 68*e* and the font selection switch 68*d* are not pressed, then the routine proceeds to step 626 wherein it is determined whether the one-line switch 68*a* has been pressed or not. If a NO answer is obtained, then the routine returns back to step 623. Alternatively, if a YES answer is obtained, then the routine proceeds to step 633 wherein the information stored in the current information storage 61 is transferred to the selection information storage 62. The routine proceeds to step 634 wherein the one-line mode is entered and terminates.

Referring back to FIG. 9, if it is determined in step 601 that the print commands have been received, the routine proceeds to step 605 wherein it is determined whether the received print commands contains a font selection command or not. If a NO answer is obtained, then the routine proceeds to step 609. Alternatively, if a YES answer is obtained, then the routine proceeds to step 606 wherein it is determined whether the information stored in the current information storage 61 matches the content of the font selection command or not. If a YES answer is obtained, then the routine proceeds to step 609. Alternatively, if a NO answer is obtained, then the routine proceeds to step 607 wherein the content of the font selection command is stored in the current information storage 61. The routine proceeds to step 608 wherein the information in the current information storage 61 is stored in the selection information storage 62. The routine proceeds to step 609 wherein the font selection operation is performed based on the information stored in the current information storage 61. The routine proceeds to step 610 wherein the normal printing operation is performed.

As described above, the information on the font selected by the control panel 55 or the information on the font selection command sent from the host device 56' are stored in the selection information storage 62. Specifically, the information on the selected font is held after the power supply switch is turned off, as shown in the flowchart of FIG. 7. Thus, the information of the font selected before the power supply switch is turned off is selected automatically by transferring the information stored in the selection information storage 62 to the current information storage 61 when the power supply switch is turned on, as shown in the flowchart of FIG. 8.

As described above, the second embodiment stores the information on the font selected by the control panel 55 or the information on the font selection command sent from the host device 56' in the selection information storage 62 made of a non-volatile memory so that the font selected immediately before the power supply is turned off can be selected automatically when the power switch is turned on again.

(Third Embodiment)

The third embodiment will be described below which is designed to store the information on the selected paper tray and font in power-off processing performed when the power supply switch is turned off. The structure of this embodiment is identical with that of the first embodiment, and explanation thereof in detail will be omitted here.

In the third embodiment, when the paper tray is selected, the information thereabout is not stored in a non-volatile memory, therefore, the operations in step 510 of FIG. 5 and step 533 of FIG. 6 are omitted. Additionally, when the front information is selected, it is not stored in a non-volatile memory, therefore, the operations in step 608 of FIG. 9 and step 633 of FIG. 10 are omitted. Instead of steps 510, 533, 608, and 633, the printer of this embodiment performs a program shown in FIG. 11.

Figures 11, 12:
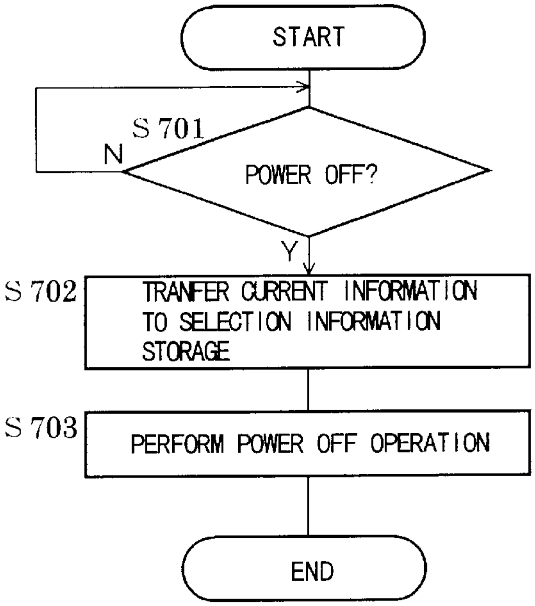
FIG. 11 is a flowchart of an operation of an image recording apparatus according to the third embodiment of the invention.
FIG. 12 is a table representing the relation between one of paper trays selected by a control panel or a host device and corresponding controlled data.

After entering the program in FIG. 11, the routine proceeds to step 701 wherein it is determined whether the power supply switch is turned off or not. If a YES answer is obtained meaning that the power supply switch is turned off, then the routine proceeds to step 702 wherein the information in the current information storage 61 is stored in the selection information storage 62 made of a non-volatile memory to memorize the paper tray and font selected before the power supply switch is turned off, after which the routine proceeds to step 703 wherein the power-off operation is performed.

The third embodiment is, as apparent from the above, designed not to store the information on the paper tray and font in the selection information storage 62 each time the paper tray and font are selected, but to store it in the selection information storage 62 in the power-off processing executed when the power switch is turned off. This causes the writing processing of the information in the non-volatile memory (i.e., the selection information storage 62) to be decreased greatly, thus resulting in the high-speed processing and an increase in service life of the non-volatile memory.

When the cover of the printer is opened for the purpose of maintenance or removing jammed paper, the selected information is held as long as the power supply to the current information storage is interrupted. This allows the paper tray and font selected before the cover is opened to be selected automatically when the cover is closed.

The processes of step 542 in FIG. 7, step 702 or step 703 in FIG. 11 are executed after the power off of the printer with a power supply, for example battery or the like, provided with the printer.

(Fourth Embodiment)

The fourth embodiment will be described below which is designed to hold, in addition to the information on the selected paper tray, control data for the paper transportation system, image transfer, and fixing which are changed based on the information on the selected paper tray. For the simplicity of disclosure, the discussion below will refer only to the paper feed mechanisms 41 and 44, and it is assumed that A4 copy sheets are stacked on the paper tray (tray 1) of the first paper feed mechanism 41, and B5 copy sheets are stacked on the paper tray (tray 2) of the second paper feed mechanism 44.

Here, the details of an operation of the electrophotographic printer will be explained with reference to FIGS. 1 and 2.

When instructions are given from the host device 56', the control unit 50 turns on the paper feed motor 54 to feed the copy sheet out of the paper feed mechanism 41 or 44. The copy sheet moves along the travel route 26 and reaches a nip formed by the standing register rollers 14 whereby the travel misalignment of the copy sheet is corrected. The copy sheet is then advanced by rotation of the register rollers 14 and reaches the write sensor 29.

The image-forming unit 15, as is well known in the art, is responsive to a signal from the write sensor 29 to initiate an image-forming operation. Specifically, the LED head 18 forms electrostatic latent images on a peripheral surface of the photosensitive drum 16 charged uniformly by the charging mechanism 17. Next, the developing mechanism 19 changes the electrostatic latent images into visible toner images which are, in turn, transported to the transfer mechanism 20. The transfer mechanism 20 establishes synchronization of rotation of the photosensitive drum 16 and transfer the toner images onto given areas on the copy sheet. The toner remaining on the photosensitive drum 16 is removed by the cleaning mechanism 21.

After the image transfer, the copy sheet passes through the fixing mechanism 22 wherein the toner images are subjected to heat and pressure and fixed on the copy sheet, after which it is ejected by the ejection rollers 23 and 24.

The transportation of the copy sheet is controlled mainly by use of the sensors 28 to 30 of the paper transportation system disposed on the paper feed path. FIG. 12 is a table representing the relation between one of the paper trays selected by the control panel 55 or the host device 56' and corresponding controlled data. L1 indicates the distance between a point of contact of the first hopping roller 43 with the copy sheet and the entrance sensor 28. L2 indicates the distance between a point of contact of the second hopping roller 46 with the copy sheet and the entrance sensor 28. L5 indicates the length of the copy sheets stored in the tray 1. L6 indicates the length of the copy sheets stored in the tray 2.

FIG. 13 is a table representing the relation between the types of errors which would arise during transportation of the copy sheets and error-monitored conditions. L3 indicates the distance between the entrance sensor 28 and the write sensor 29. L4 indicates the distance between the write sensor 29 and the ejection sensor 30. L1 to L6 allow for certain errors, respectively.

"Paper Feed Error" indicates an error detected if a leading edge of the copy sheet does not reach the entrance sensor 28 within a given period of time which corresponds to the range (L1 in case of the tray 1 or L2 in case of the tray 2) in which the copy sheet advances from the start of an hopping operation. "Path Paper Jam 1" indicates an error detected if the leading edge of the copy sheet does not reach the write sensor 29 within a given period of time which corresponds to the range (L3) in which the copy sheet advances after reaching the entrance sensor 28. "Path Paper Jam 2" indicates an error detected if the leading edge of the copy sheet does not reach the ejection sensor 30 within a given period of time which corresponds to the range (L4) in which the copy sheet advances after reaching the write sensor 29.

"Outlet Paper Jam" indicates an error detected if a trailing edge of the copy sheet does not reach the ejection sensor 30 within a given period of time which corresponds to the range (L5 in case of the tray 1 or L6 in case of the tray 2) in which the copy sheet advances after the leading edge thereof reaches the ejection sensor 30.

"Paper Feed Error" and "Outlet Paper Jam" are different in reference value according to the selected tray, respectively. Thus, control data different according to the selected trays are stored in the selection information storage 62 made of the non-volatile memory together with the tray selection information.

The transfer current and fixing temperature, as shown in FIG. 12, vary with the type of copy sheets and thus are controlled data different according to the selected tray. They are, therefore, stored in the selection information storage 62 together with the tray selection information.

The above controlled data, similar to the first embodiment, may be stored in the selection information storage 62 each time the tray selection information is set or alternatively, similar to the third embodiment, immediately before the power-off operation is performed following turning off of the power supply switch.

The information stored in the selection information storage 62 is held even after the power supply switch is turned off. When the power supply switch is turned on again, the paper feed and image-forming operations are performed based on the controlled data set just before the turning off of the power supply switch, thus resulting in an increase in speed of an initial operation of the printer.

The fourth embodiment is, as apparent from the above discussion, designed to store the reference values of the paper transportation system and the controlled data on the transfer current and fixing temperature in the non-volatile memory together with the tray selection information to hold the information in the non-volatile memory even after the power supply switch is turned off. Thus, when the power supply is, turned on, the paper feed and image-forming operations are performed based on the controlled data set just before the turning off of the power supply switch, thus resulting in an increase in speed of an initial operation of the printer.

The above embodiments refers to the electrophotographic printer, but may be used with ink jet printers or copying machines. In this case, controlled data are determined depending upon the type of a used device.

(Fifth Embodiment)

Each of the above embodiments is designed to selectively store one of the information set by the control panel and the information set by a command sent from the host device in the non-volatile memory by rewriting the information therein. However, in a case where the printer is connected to a network to allow a plurality of operators to use the printer, frequent rewriting of the set information by commands given by the operators may cause inconvenience to the operators. In this case, only the information provided by the control panel may be stored in the non-volatile memory.

The processing of paper feed tray information in the fifth embodiment will be described with reference to FIG. 14.

Figure 14:
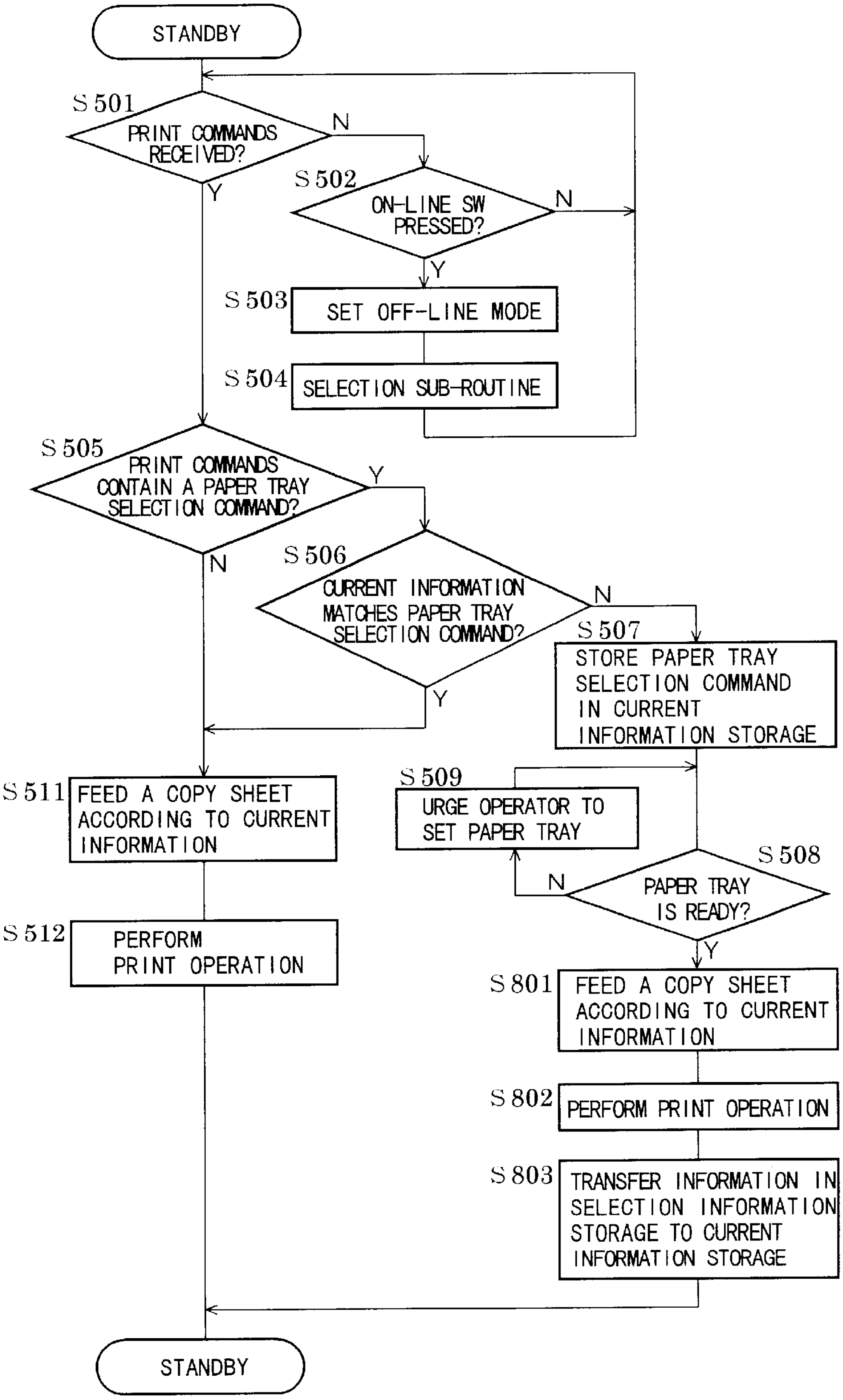
FIGS. 14 and 15 are flowcharts of operations of an image recording apparatus according to the fifth embodiment of the invention.

FIG. 14 is a flowchart of a printer operation when the power supply switch is turned on. Immediately after the power switch is turned on, the printer is in the on-line mode.

First, in step 501, it is determined, similar to the first embodiment, whether print commands have been received from the host device 56' through the interfacing circuit 56 or not. If a YES answer is obtained, then the routine proceeds to step 505. Alternatively, if a NO answer is obtained, then the routine proceeds to step 502 wherein it is determined whether the on-line switch 68*a* has been pressed or not. If a NO answer is obtained, then the routine returns back to step 501. Alternatively, if a YES answer is obtained, then the routine proceeds to step 503 wherein the printer is brought into the off-line mode. The routine then proceeds to step 504 of the paper tray selection to be made by the control panel 55, as shown in FIG. 6.

After entering step 504, the routine proceeds to step 521 wherein it is determined whether the tray selection function is chosen by the menu switch 68*b* or not. If a YES answer is obtained, then the routine proceeds to step 522 wherein the information in the current information storage 61 is displayed on the LCD 67 for informing an operator of selected one of the paper trays. The routine proceeds to step 523 wherein it is determined whether the confirmation switch 68*e* has been pressed or not. If a YES answer is obtained, then the routine proceeds to step 526. Alternatively, if a NO answer is obtained, then the routine proceeds to step 524 wherein it is determined whether the tray selection switch 68*c* has been pressed or not. If a YES answer is obtained, then the routine proceeds to step 525 wherein information about one of the paper trays selected in accordance with the procedure for paper tray selection as explained in FIG. 4 is stored in the current information storage 61 and returns back to step 522.

If both the confirmation switch 68*e* and the tray selection switch 68*c* are not pressed, then the routine proceeds to step 526 wherein it is determined whether the one-line switch 68*a* has been pressed or not. If a NO answer is obtained, then the routine returns back to step 523. Alternatively, if a YES answer is obtained, then the routine proceeds to step 531 wherein it is determined whether the paper tray selected and stored in the current information storage 61 is ready for feeding the copy sheets or not.

If a NO answer is obtained in step 531, then the routine proceeds to step 532 wherein the operator is urged to set the paper tray through the LCD 67 and the paper lamp 66*c*. If the paper tray is ready, the routine proceeds to step 533 wherein the information stored in the current information storage 61 is transferred to the selection information storage 62, thereby holding the information from the control panel 55 including the tray selection information in the selection information storage 62. The routine proceeds to step 534 wherein the one-line mode is entered and terminates.

Referring back to FIG. 14, if it is determined in step 501 that the print commands have been received, the routine proceeds to step 505 wherein it is determined whether the received print commands contains a paper tray selection command or not. If a NO answer is obtained, then the routine proceeds to step 511. Alternatively, if a YES answer is obtained, then the routine proceeds to step 506 wherein it is determined whether the information stored in the current information storage 61 matches the content of the paper tray selection command or not. If a YES answer is obtained, then the routine proceeds to step 511. Alternatively, if a NO answer is obtained, then the routine proceeds to step 507 wherein the content of the paper tray selection command is stored in the current information storage 61. The routine proceeds to step 508 wherein it is determined whether it is determined whether the paper tray is ready or not. If a NO answer is obtained, then the routine proceeds to step 509 wherein the operator is urged to set the paper tray.

If a YES answer is obtained in step 508, then the routine proceeds to step 801 wherein the copy sheet is fed to the image-forming mechanism 15 according to the content of the information stored in the current information storage 61 to print images on the copy sheet. The routine proceeds to step 802 wherein the printing operation is performed.

Afterwards, the information corresponding to a paper selection command issued from the host device 56' stored in the current information storage 61 is rewritten to store the selection information from the control panel 55 held in the selection information storage 62 in step 533 of FIG. 6 in order to operate the printer according to the selection information from the control panel 55 when the printer starts to operates again following the standby mode after completion of printing (step 803).

Therefore, when the printer restarts following the standby mode or after the power supply is turned off, the printer operates according to the selection information from the control panel 55 if print commands don't contain a paper tray selection command.

Figure 15:
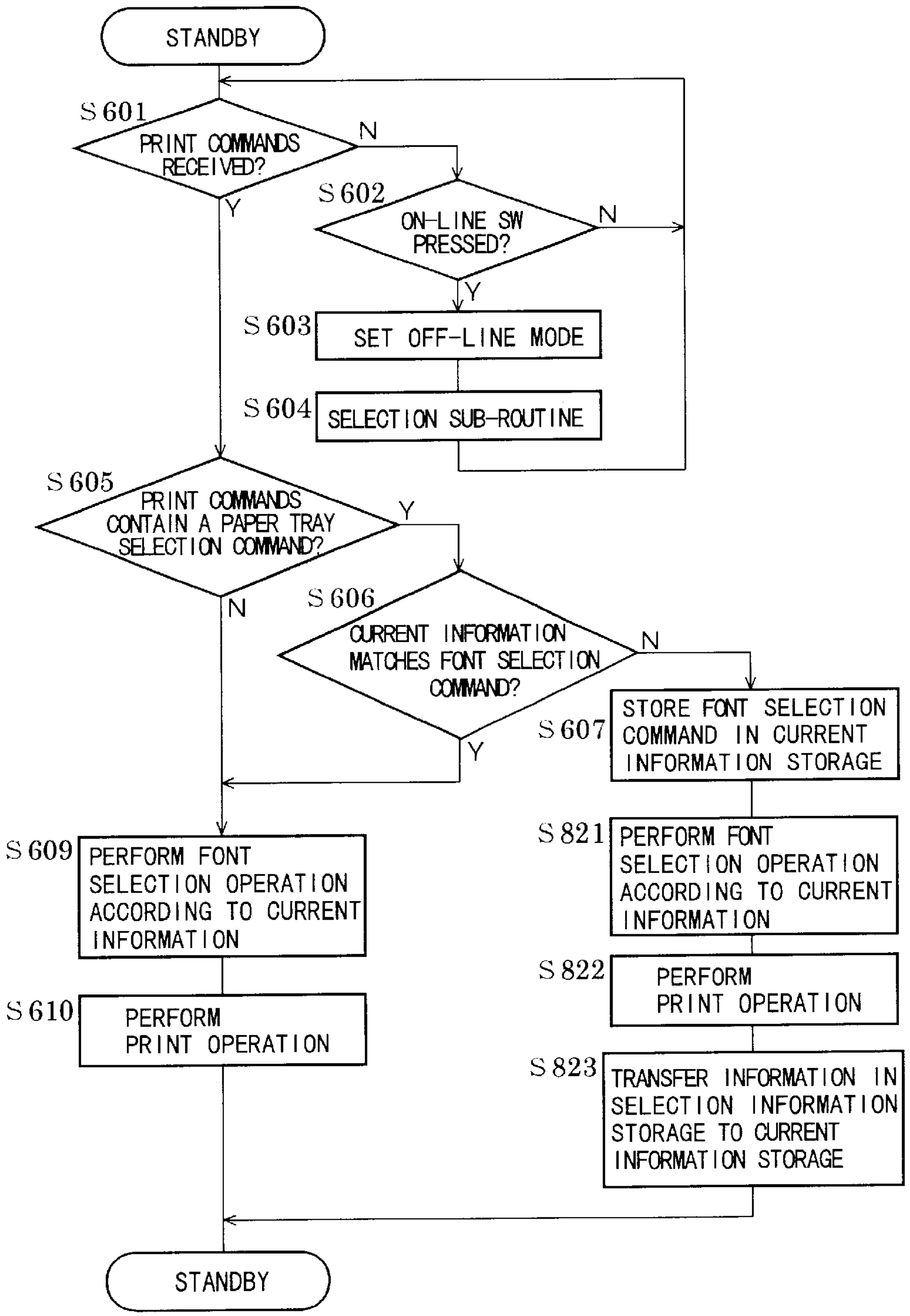

A sequence of steps for font selection in the fifth embodiment is shown in a flowchart of FIG. 15 which is identical with the one shown in FIG. 2 except steps 821, 822, and 823.

Similar to the operation for selection of the paper trays as discussed in FIG, 14, when font information different from the information stored in the current information storage 61 is received from the host device 56', the font selection information from the host device 56' is written in the current information storage 61 in step 607 for performing the printing operation according to the font information.

Data on print processing is unwound in the image-forming mechanism 15 according to the font information written in the current information storage 61 (step 821). The print processing is performed in the image-forming mechanism 15 (step 822).

Afterwards, the information corresponding to the font selection command from the host device 56' is rewritten in step 823 to store the font selection information stored in the selection information storage 62 in step 633 of FIG. 10.

Therefore, in the restart operation following the standby mode or after the power supply is turned off, the printer operates, according to the selection information from the control panel 55 if print commands don't contain a font selection command.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An image recording apparatus for recording an image on any one of a plurality of differing recording media which are stored in corresponding recording medium storage portions, the image being recorded at an image formation portion, said image recording apparatus comprising:

a volatile memory to store information indicating one of said recording medium storage portions;

a non-volatile memory to store information indicating one of said recording medium storage portions;

a control unit which, when new information indicating one of said recording medium storage portions is inputted, compares said new information with said information in said volatile memory, judges whether said new information is different from said information in said volatile memory, and if they are judged to be different, updates said information in both of said memories by storing said new information in said volatile memory and then updating said non-volatile memory with said new information that is stored in said volatile memory; and a selection mechanism which selects one of said recording medium storage portions based on said information in said non-volatile memory, for supplying said recording medium in the selected recording medium storage portion to said image forming portion.

2. The image recording apparatus of claim 1, wherein said image recording apparatus receives image data for said image in print commands from a host device, wherein the print commands may additionally designate said information indicating one of said recording medium storage portions, and wherein said image recording apparatus further comprises a control panel having manually operable means for inputting said information indicating one of said recording medium storage portions.

3. The image recording apparatus of claim 1, further comprising a control panel with a display, said display showing said information indicating one of said recording medium storage portions that is stored in said volatile memory.

4. The image recording apparatus of claim 1, wherein said image recording apparatus further comprises a control panel having manually operable means for inputting said information indicating one of said recording medium storage portions, wherein said image recording apparatus has an on-line mode and an off-line mode, wherein said control unit comprises means for judging, when said image recording apparatus is in the on-line mode, whether a recording medium storage portion that was selected with the means for inputting while the image recording apparatus was in the off-line mode is ready, and said control unit does not store information indicating the selected recording medium storage portion in said volatile memory until it is ready.

5. The image recording apparatus of claim 1, wherein said image recording apparatus further comprises a control panel having manually operable means for inputting information.

6. The image recording apparatus of claim 1, wherein the control unit updates said non-volatile memory with said information indicating one of said recording medium storage portions when power to said image recording apparatus is turned off, and then executes a power-off operation.

7. An image recording apparatus for recording an image on any one of a plurality of differing recording media which are stored in corresponding recording medium storage portions, the image being recorded at an image formation portion, said image recording apparatus comprising:

a current information storage to store information indicating one of said recording medium storage portions;

a control unit which, when new information indicating one of said recording medium storage portions is inputted, compares said new information with said information in said current information storage, judges whether said new information is different from said information in said current information storage, and if they are judged to be different, updates said information in said current information storage by said new information;

a selection mechanism which selects one of said recording medium storage portions based on said information in said current information storage, for supplying said recording medium in the selected recording medium storage portion to said image forming portion; and a non-volatile memory to store said information stored in said current information storage, wherein said control unit makes said current information storage store said information stored in said non-volatile memory when a power supply is turned on.

8. The image recording apparatus of claim 7, wherein said current information storage is a RAM.

9. The image recording apparatus of claim 7, wherein said non-volatile memory saves said information stored in said current information storage after said current information storage has stored said new information.

10. The image recording apparatus of claim 7, wherein said non-volatile memory saves said information stored in said current information storage while a power off process is performed.

11. The image recording apparatus of claim 7, wherein said control unit comprises means for receiving a command signal which is outputted from a host device and which contains said information indicating one of said recording medium storage portions, and for interpreting said command signal.

12. The image recording apparatus of claim 7, wherein said image recording apparatus receives image data for said image in print commands from a host device, wherein the print commands may additionally designate said information indicating one of said recording medium storage portions, and wherein said image recording apparatus further comprises a control panel having manually operable means for inputting said information indicating one of said recording medium storage portions.

13. The image recording apparatus of claim 7, further comprising a control panel with a display, said display showing said information indicating one of said recording medium storage portions that is stored in said volatile memory.

14. The image recording apparatus of claim 7, wherein said image recording apparatus further comprises a control panel having manually operable means for inputting said information indicating one of said recording medium storage portions, wherein said image recording apparatus has an on-line mode and an off-line mode, wherein said control unit comprises means for judging, when said image recording apparatus is in the on-line mode, whether a recording medium storage portion that was selected with the means for inputting while the image recording apparatus was in the off-line mode is ready, and said control unit does not store information indicating the selected recording medium storage portion in said volatile memory until it is ready.

15. The image recording apparatus of claim 7, wherein said image recording apparatus further comprises a control panel having manually operable means for inputting information.

16. The image recording apparatus of claim 7, wherein the control unit updates said non-volatile memory with said information indicating one of said recording medium storage portions when power to said image recording apparatus is turned off, and then executes a power-off operation.

17. An image recording apparatus which has a plurality of fonts and performs image processing in which any one of said fonts is selected, comprising:

a volatile memory to store information indicating one of said fonts;

a non-volatile memory to store information indicating one of said fonts;

a control unit which, when a new information indicating one of said fonts is inputted, compares said new information with said information in said volatile memory, judges whether said new information is different from said information in said volatile memory, and if they are judged to be different, updates said information in both of said memories by storing said new information in said volatile memory and then updating said non-volatile memory with said new information that is stored in said volatile memory; and a selection mechanism which selects one of said fonts based on said information in said non-volatile memory.

18. The image recording apparatus of claim 17, wherein said image recording apparatus receives image data for said image in print commands from a host device, wherein the print commands may additionally designate said information indicating one of said fonts, and wherein said image recording apparatus further comprises a control panel having manually operable means for inputting said information indicating one of said fonts.

19. The image recording apparatus of claim 17, further comprising a control panel with a display, said display showing said information indicating one of said fonts that is stored in said volatile memory.

20. The image recording apparatus of claim 17, wherein said image recording apparatus further comprises a control panel having manually operable means for inputting information.

21. The image recording apparatus of claim 17, wherein the control unit updates said non-volatile memory with said information indicating one of said fonts when power to said image recording apparatus is turned off, and then executes a power-off operation.

22. An image recording apparatus which has a plurality of fonts and performs image processing in which any one of said fonts is selected, comprising:

a current information storage to store information indicating one of said fonts;

a control unit which, when new information indicating one of said fonts is inputted, compares said new information with said information in said current information storage, judges whether said new information is different from said information in said current information storage, and if they are judged to be different, updates said information in said current information storage by said new information;

a section mechanism which selects one of said fonts based on said information in said current information storage; and a non-volatile memory to store said information stored in said current information storage, wherein said control unit makes said current information storage save said information stored in said non-volatile memory when a power supply is turned on.

23. The image recording apparatus of claim 22, wherein said current information storage is a RAM.

24. The image recording apparatus of claim 22, wherein said non-volatile memory saves said information stored in said current information storage after said current information storage has stored new information.

25. The image recording apparatus of claim 22, wherein said non-volatile memory saves said information stored in said current information storage while a power off process is performed.

26. The image recording apparatus of claim 22, wherein said control unit comprises means for receiving a command signal which is outputted from a host device and which contains said information indicating one of said fonts, and for interpreting said command signal.

27. The image recording apparatus of claim 22, wherein said image recording apparatus receives image data for said image in print commands from a host device, wherein the print commands may additionally designate said information indicating one of said fonts, and wherein said image recording apparatus further comprises a control panel having manually operable means for inputting said information indicating one of said fonts.

28. The image recording apparatus of claim 22, further comprising a control panel with a display, said display showing said information indicating one of said fonts that is stored in said volatile memory.

29. The image recording apparatus of claim 22, wherein said image recording apparatus further comprises a control panel having manually operable means for inputting information.

30. The image recording apparatus of claim 22, wherein the control unit updates said non-volatile memory with said information indicating one of said fonts when power to said image recording apparatus is turned off, and then executes a power-off operation.

31. An image recording apparatus for performing an image forming processing on one of a plurality of differing recording media which are stored in corresponding recording medium storage portions, based on control information corresponding to said one of a plurality of recording media, the image forming process being performed at an image forming portion, comprising:

a volatile memory to store control information, said control information including information indicating one of said recording medium storage portions;

a non-volatile memory to store control information; and a control unit which, when new information indicating one of said recording medium storage portions is inputted, compares said new information with said information indicating one of said recording medium storage portions in said volatile memory, and if they are different, updates both memories by storing new control information therein, wherein said control unit selects said one of said recording medium storage portions based on said control information in said volatile memory, supplies said recording medium from the selected recording medium storage portion to said image forming portion, and performs said image forming processing based on said control information in said volatile memory.

32. The image recording apparatus of claim 31, wherein said control information additionally includes information relating to conveyance of said recording medium.

33. The image recording apparatus of claim 31, wherein said image forming portion includes a transfer mechanism to transfer a toner image onto said recording medium, and said control information additionally includes information relating to the transfer of electric current of said transfer mechanism.

34. The image recording apparatus of claim 33, wherein said image forming portion further includes a fixing mechanism to fix said toner image on said recording medium by heating, and said control information more additionally includes information relating to the fixing temperature of said fixing mechanism.

* * * * *